(12) United States Patent
Wang et al.

(10) Patent No.: US 11,431,064 B2
(45) Date of Patent: Aug. 30, 2022

(54) HYBRID BATTERY

(71) Applicants: Dexi Wang, Hubei (CN); Ronghua Chen, Guangdong (CN)

(72) Inventors: Dexi Wang, Hubei (CN); Ronghua Chen, Guangdong (CN)

(73) Assignees: Guangzhou Kage Power Industry Co. Ltd., Guangzhou (CN); Guangzhou Mintong Trading Co. Ltd., Guangzhou (CN)

( * ) Notice: Subject to any disclaimer, the term of this patent is extended or adjusted under 35 U.S.C. 154(b) by 642 days.

(21) Appl. No.: 16/383,672

(22) Filed: Apr. 15, 2019

(65) Prior Publication Data

US 2020/0106078 A1    Apr. 2, 2020

(30) Foreign Application Priority Data

Sep. 30, 2018    (CN) .......................... 201811160587.7

(51) Int. Cl.
  *H01M 50/543* (2021.01)
  *H01M 50/60* (2021.01)
  *H01M 50/502* (2021.01)
(52) U.S. Cl.
  CPC ....... *H01M 50/543* (2021.01); *H01M 50/502* (2021.01); *H01M 50/60* (2021.01)

(58) Field of Classification Search
  CPC ............. H01M 50/502; H01M 50/543; H01M 50/267; H01M 50/147; H01M 50/20; H01M 16/00; H01M 12/00; H01M 10/12
  See application file for complete search history.

(56) References Cited

U.S. PATENT DOCUMENTS 9,776,517 B2 * 10/2017 Sakata .............. H01M 10/6551
2017/0279099 A1 * 9/2017 Reinhard .............. H01M 10/12

FOREIGN PATENT DOCUMENTS

WO    WO-2014068919 A1 *  5/2014  .......... H01M 10/613

\* cited by examiner

*Primary Examiner* — Maria Laios

(57) ABSTRACT

The invention relates to a battery, in particular to a hybrid battery. The invention provides a hybrid battery that is easy to replace a terminal block and has low maintenance cost, comprising a casing and at least two different sets of battery cells arranged in the casing, wherein the casing is detachably provided with a terminal block, the terminal block is electrically connected with the electrode of the battery cells. When in use, the terminal block in the invention can be detached from the hybrid battery in time if the terminal block is oxidized and blackened for long time use, and only the terminal block is replaced instead of the entire hybrid battery, therefore, the maintenance cost of the hybrid battery is low.

9 Claims, 3 Drawing Sheets

HYBRID BATTERY

FIELD OF THE INVENTION

The invention relates to a battery, in particular to a hybrid battery.

DESCRIPTION OF THE RELATED ART

Hybrid batteries refer to batteries composed by more than two battery cells placing in a casing, and the cooperation of two batteries with different media (for example, lead-acid storage battery and lithium battery) can effectively reduce the use cost of batteries, and be suitable for occasions requiring long-term and high-capacity power supply.

In the prior hybrid batteries, the terminal block of the casing thereof is weld with the battery wiring post to make sure the firm connection in use, however, the terminal block is easily oxidized after long term use, thereby the resistance is increased and the battery efficiency is affected. Moreover, since the terminal block is weld with the battery wiring post, the terminal block cannot be replaced separately, and the entire battery must be replaced, which caused high maintenance cost.

With the increasing of use time, the lead-acid storage battery must be replenished with acidic liquid, and the residual acid liquid needs to be washed off after the acid liquid is replenished each time, but the water may permeate along the commissure of short and thick block and casing when washing, which makes the battery uneasy to clean, accelerates the rusting of the terminal block, and affects the service life of the hybrid battery.

SUMMARY OF THE INVENTION

In order to overcome the defects in the prior art, the invention aims at providing a hybrid battery that is easy to replace a terminal block and has low maintenance cost.

The object of the invention can be achieved by adopting following technical schemes: a hybrid battery, comprising a casing and at least two different sets of battery cells arranged in the casing, wherein the casing is detachably provided with a terminal block, the terminal block is electrically connected with the electrode of the battery cells.

Further, the terminal block comprises a base plate made of conductive materials, an intermediate plate and a top plate are successively overlapped on the base plate, and the intermediate plate and the top plate are detachably connected on the base plate through screws.

Further, the base plate is a rectangular plate, the end face of the rectangular plate is provided with four screw holes, the inside wall of screw holes are provided with internal threads.

Further, the intermediate plate comprises a sole plate in L-shape, through holes I are provided on the long side of the sole plate, a step surface is provided on the sole plate, and a through hole II is provided on the step surface.

Further, the top plate comprises a top plate I and a top plate II which are mutually independent, the top plate I and the top plate II are detachably arranged on the intermediate plate respectively.

Further, the top plate I has the same structure as the top plate II, the top plate I comprises a base top plate and a convex plate arranged on one side of the base top plate, a concave portion of the convex plate is matched with the casing; the base top plate and the convex plate are provided with fixing holes for fixing with the intermediate plate.

Further, the casing comprises a body with an upper opening and a covering covered on the opening of the body, the body is divided into a battery cells chamber I and a battery cells chamber II by a clapboard, the clapboard is provided with suspension holes, partition plates are arranged in the battery cells chamber II, the battery cells chamber II is divided into containing chambers by the partition plates to arrange one of the battery cells.

Further, the casing comprises a base body, the base body is provided with acid injection holes in the longitudinal direction, the acid injection holes are connected with the containing chambers; the base body is respectively provided with wiring post hole at both ends in the longitudinal direction, a containing groove is provided between wiring post holes and one side of the base body, the containing groove is used for containing the base plate, and one side of the containing groove is provided with a positioning table for fixing the position of the base plate.

Further, lug bosses are provided on the groove bottom of the containing groove, the base plate is arranged on the lug bosses, and there is a gap between the base plate and the groove bottom of the containing groove.

Compared to the prior art, when in use of the invention, the terminal block in the invention can be detached from the hybrid battery in time if the terminal block is oxidized and blackened for long time use, and only the terminal block is replaced instead of the entire hybrid battery, therefore, the maintenance cost of the hybrid battery is low.

The intermediate plate is used for fixed connection with the wiring post of the battery cells in the casing, the base plate is arranged on the casing, the base plate is pressed on the casing through the fixed connection between the intermediate plate and the battery cells to avoid the movement of the base plate on the casing. External wires are connected between the intermediate plate and the top plate, the external wires are connected with the wiring post of the battery cells by the terminal block as middle conductor. In the invention, the top plate can be easily detached if the joint of external wires is blackened when in use, and the entire hybrid battery does not need to be replaced, therefore, the maintenance cost of the hybrid battery is low.

In the accompanying drawings: 1 refers to casing; 11 refers to body; 111 refers to battery cells chamber I; 111 refers to suspension hole; 112 refers to battery cells chamber II; 1121 refers to containing chamber; 12 refers to covering; 121 refers to base body; 122 refers to acid injection hole; 123 refers to wiring post hole; 124 refers to positioning table; 125 refers to lug boss; 126 refers to containing groove; 2 refers to terminal block; 21 refers to base plate; 211 refers to screw hole; 22 refers to intermediate plate; 221 refers to sole plate; 222 refers to through hole I; 223 refers to step surface; 224 refers to through hole II; 23 refers to top plate; 231 refers to convex plate; 232 refers to fixing hole; 233 refers to base top plate.

DETAILED DESCRIPTION OF THE PREFERRED EMBODIMENTS

The invention is further described in details with reference to accompanying drawings and specific embodiments, and it should be noted that, a new embodiment may be formed by any combination between embodiments or technical features described below in case of no conflict.

Figure 1:
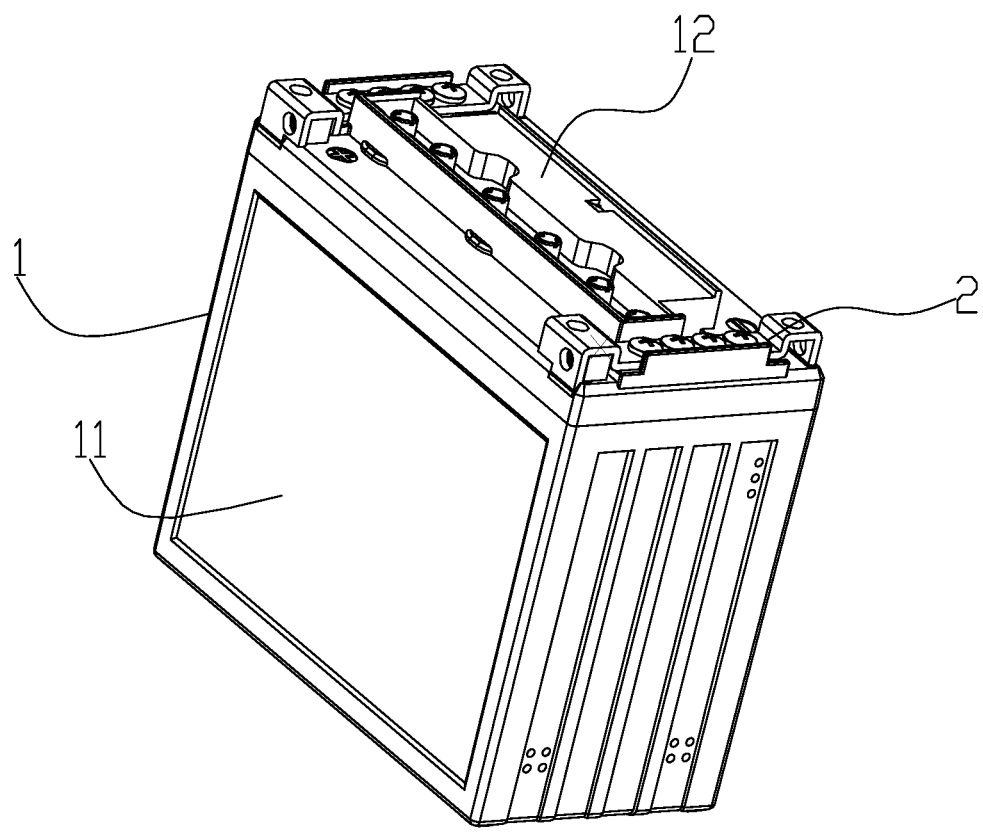
FIG. 1 shows the structure of the invention.
Figure 2:
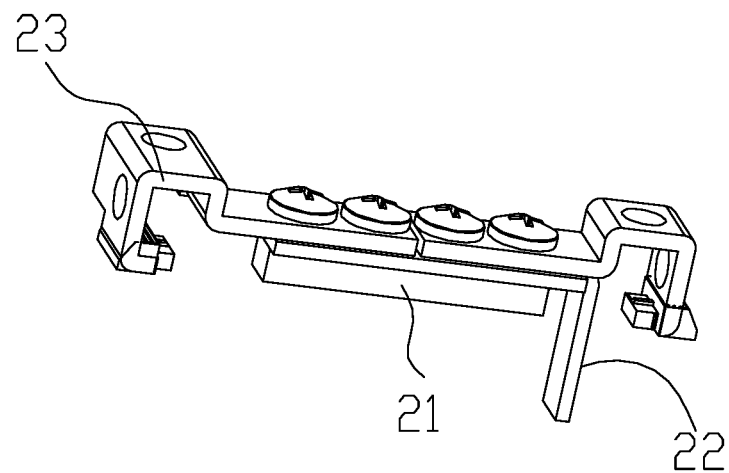
FIG. 2 shows the structure of the terminal block in the invention.
Figure 3:
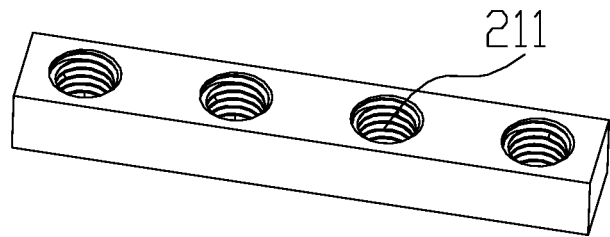
FIG. 3 shows the structure of a base plate of the terminal block in the invention.
Figure 4:
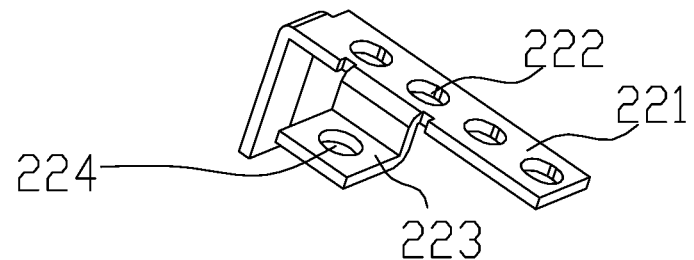
FIG. 4 shows the structure of an intermediate plate of the terminal block in the invention.
Figure 5:
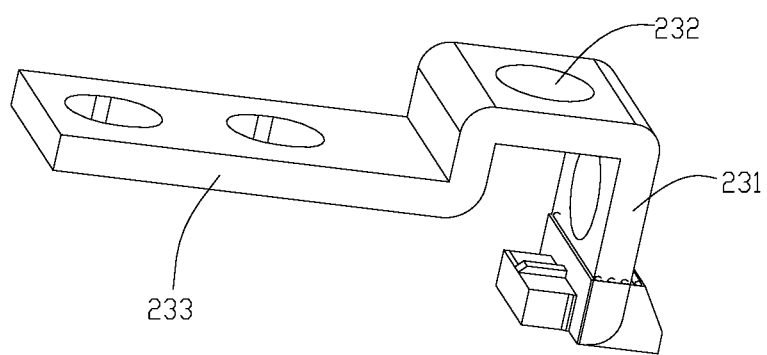
FIG. 5 shows the structure of a top plate of the terminal block in the invention.
Figure 6:
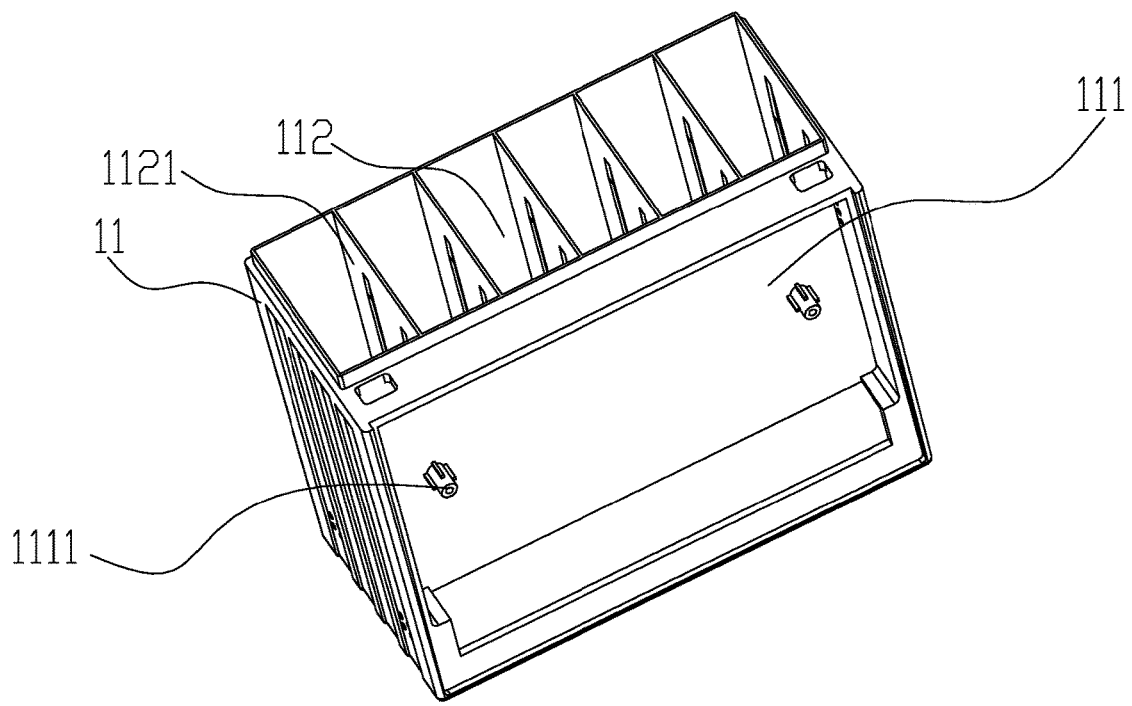
FIG. 6 shows the structure of the body of the casing in the invention.
Figure 7:
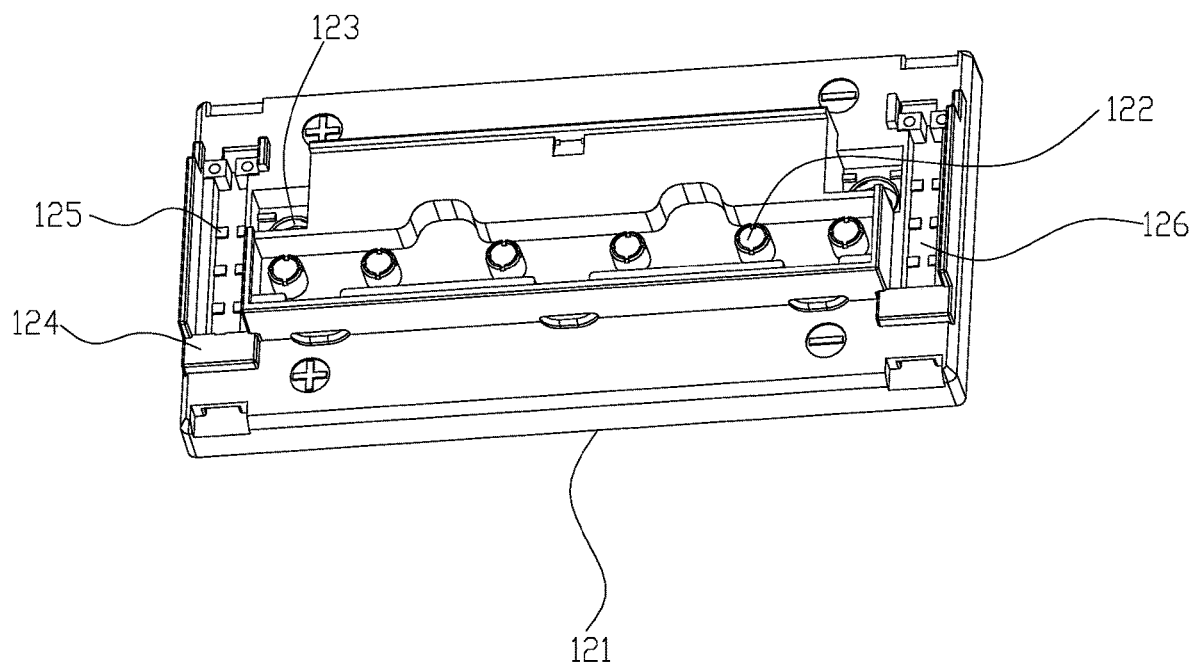
FIG. 7 shows the structure of the covering of the casing in the invention.

As shown in FIG. 1-7 of the invention, a hybrid battery, comprising a casing 1 and at least two different sets of battery cells arranged in the casing 1, wherein the casing 1 is detachably provided with a terminal block 2, the terminal block 2 is electrically connected with the electrode of the battery cells. When in use, the terminal block 2 in the invention can be detached from the hybrid battery in time if the terminal block 2 is oxidized and blackened for long time use, and only the terminal block 2 is replaced instead of the entire hybrid battery, therefore, the maintenance cost of the hybrid battery is low.

The terminal block 2 comprises a base plate 21 made of conductive materials, an intermediate plate 22 and a top plate 23 are successively overlapped on the base plate 21, and the intermediate plate 22 and the top plate 23 are detachably connected on the base plate 21 through screws. The intermediate plate 22 is used for fixed connection with the wiring post of the battery cells in the casing 1, the base plate 21 is arranged on the casing 1, the base plate 21 is pressed on the casing 1 through the fixed connection between the intermediate plate 22 and the battery cells to avoid the movement of the base plate 21 on the casing 1. External wires are connected between the intermediate plate 22 and the top plate 23. In the invention, the top plate 23 can be easily detached if the joint of external wires is blackened when in use, and the entire hybrid battery does not need to be replaced, therefore, the maintenance cost of the hybrid battery is low.

The base plate 21 is a rectangular plate, the end face of the rectangular plate is provided with four screw holes 211, the inside wall of screw holes 211 are provided with internal threads. The base plate 21 is pressed against between the casing 1 and the intermediate plate 22 by the intermediate plate 22 weld on the wiring post of battery cells, the top plate 23 is overlapped on the intermediate plate 22 and connected on the base plate 21 by bolts.

The intermediate plate 22 comprises a sole plate 221 in L-shape, through holes I 222 are provided on the long side of the sole plate 221, a step surface 223 is provided on the sole plate 221, and a through hole II 224 is provided on the step surface 223. The through holes I 222 are used for connecting to the base plate 221, the bolts pass through the through hole I 222, and the top plate 23 and the intermediate plate 22 overlapped on the intermediate plate 22 are connected to he base plate 21. The through hole II 224 is sleeved on the wiring post of the battery cell (lead-acid storage battery) and is welded to the wiring post of the lead-acid battery to ensure a firm connection.

The short side of the intermediate plate 22 is directly inserted into the wiring post of another battery cell (lithium battery), for the intermediate plate 22 is welded to the wiring post of the lead-acid storage battery, the short side of the intermediate plate 22 can be stably inserted into the wiring post of the lithium battery, the connection between the hybrid battery and external wires is conveniently realized by one intermediate plate connecting two different battery cells.

The top plate 23 comprises a top plate I and a top plate II which are mutually independent, the top plate I and the top plate II are detachably arranged on the intermediate plate 22 respectively. External wires are formed between the top plate I and the top plate II, and the wires exposing the conductor of the external wires need to be pressed between the top plate I and the top plate II when in connection, when the top plate 23 is oxidized for long time use, the top plate 23 is separately detached to replace, instead of the entire hybrid battery, therefore, the maintenance cost of the hybrid battery is low.

The top plate I has the same structure as the top plate II, the top plate I comprises a base top plate 233 and a convex plate 231 arranged on one side of the base top plate 233, a concave portion of the convex plate 231 is matched with the casing 1; the base top plate 233 and the convex plate 231 are provided with fixing holes 232 for fixing with the intermediate plate 22.

The casing 1 comprises a body 11 with an upper opening and a covering 12 covered on the opening of the body 11, the body 11 is divided into a battery cells chamber I 111 and a battery cells chamber II 112 by a clapboard, the clapboard is provided with suspension holes 1111, partition plates are arranged in the battery cells chamber II 112, the battery cells chamber II 112 is divided into containing chambers 1121 by the partition plates to arrange one of the battery cells. Lead-acid storage batteries are arranged in the battery cells chamber II 112 and a lithium battery is arranged in the battery cells chamber I 111, the lithium battery is fixed on the suspension holes 1111 by screws, and the lead-acid batteries are arranged in the containing chambers 1121 of the battery cells chamber II 112 respectively, thereby, the entire hybrid battery is obtained.

The covering 12 comprises a base body 121, the base body 121 is provided with acid injection holes 122 in the longitudinal direction, the acid injection holes 122 are connected with the containing chambers; the acid injection holes 122 are used to inject the acid liquid into the lead-acid storage battery during the maintenance of the lead-acid storage battery, and the acid injection holes 122 are sealed in use.

The base body 121 is respectively provided with wiring post hole 123 at both ends in the longitudinal direction, a containing groove 126 is provided between wiring post holes 123 and one side of the base body 121, the containing groove 126 is used for containing the base plate 21, and one side of the containing groove 126 is provided with a positioning table 124 for fixing the position of the base plate 21. The wiring posts of the lead-acid storage battery are protruded from the wiring holes, the containing groove 126 is used to arrange base plate 21, the base plate 21 is attached to the positioning table 124 to facilitate the welding of the intermediate plate 22 to the base plate 21, and after welding, the base plate 21 is pressed into the containing groove 126 by the intermediate plate 22 to avoid the movement of the base plate 21.

Lug bosses 125 are provided on the groove bottom of the containing groove 126, the base plate 21 is arranged on the lug bosses 125, and there is a gap between the base plate 21 and the groove bottom of the containing groove 126. The base plate 21 is attached to the lug bosses 125, and a gap is formed between the base plate 21 and the groove bottom, since the residual acid liquid needs to be washed off by water after the acid liquid is replenished each time, and in order to avoid the residual water rusting the base plate 21, the lug bosses 125 are provided, therefore, the water may permeate along the gap between the base plate 21 and the groove bottom instead of remaining on the base plate 21, which protects the terminal block 2 from rusting and extends the service life of the terminal block 2.

The above embodiments are merely the preferred embodiments of the invention, and the scope of the invention is not limited thereto, and any immaterial changes and replacement made by those skilled in the art based on the invention should belong to the claimed scope of the invention.

The invention claimed is:

1. A hybrid battery, comprising a casing and at least two different sets of battery cells arranged in the casing, wherein the casing is detachably provided with a terminal block, the terminal block is electrically connected with the electrode of the battery cells,
wherein the terminal block comprises a base plate, an intermediate plate and a top plate are successively overlapped on the base plate, and the intermediate plate and the top plate are detachably connected on the base plate through screws.

2. The hybrid battery of claim 1, wherein the base plate is a rectangular plate, the end face of the rectangular plate is provided with four screw holes, the inside wall of screw holes are provided with internal threads.

3. The hybrid battery of claim 1, wherein the intermediate plate comprises a sole plate in L-shape, through holes I are provided on the long side of the sole plate, a step surface is provided on the sole plate, and a through hole II is provided on the step surface.

4. The hybrid battery of claim 1, wherein the top plate comprises a top plate I and a top plate II which are mutually independent, the top plate I and the top plate II are detachably arranged on the intermediate plate respectively.

5. The hybrid battery of claim 4, wherein the top plate I has the same structure as the top plate II, the top plate I comprises a base top plate and a convex plate arranged on one side of the base top plate, a concave portion of the convex plate is matched with the casing; the base top plate and the convex plate are provided with fixing holes for fixing with the intermediate plate.

6. The hybrid battery of claim 1, wherein the casing comprises a body with an upper opening and a covering covered on the opening of the body; the covering comprises a base body, a containing groove is provided on one side of the base body, the containing groove is used for containing the base plate, lug bosses are provided on the groove bottom of the containing groove, the base plate is arranged on the lug bosses, and there is a gap between the base plate and the groove bottom of the containing groove.

7. The hybrid battery of claim 6, wherein one side of the containing groove is provided with a positioning table for fixing the position of the base plate.

8. The hybrid battery of claim 6, wherein the body is divided into a battery cells chamber I and a battery cells chamber II by a clapboard, the clapboard is provided with suspension holes, partition plates are arranged in the battery cells chamber II, the battery cells chamber II is divided into containing chambers by the partition plates to arrange one of the battery cells.

9. The hybrid battery of claim 8, wherein the base body is provided with acid injection holes in the longitudinal direction, the acid injection holes are connected with the containing chambers, and the base body is respectively provided with wiring post hole at both ends in the longitudinal direction.

* * * * *